United States Patent [19]

Bergeron

[11] Patent Number: 4,729,572
[45] Date of Patent: Mar. 8, 1988

[54] WHEELED SEAT CARRYING APPARATUS AND STROLLER FOR THE HANDICAPPED

[76] Inventor: Timothy J. Bergeron, R.D. 1, Box 40, Dolgeville, N.Y. 13329

[21] Appl. No.: 32,222

[22] Filed: Mar. 30, 1987

[51] Int. Cl.⁴ ............................................. B62B 11/00
[52] U.S. Cl. .................................. 280/47.4; 280/650; 297/310
[58] Field of Search ................ 248/166, 434; 297/310, 297/345; 108/12; 280/642, 647, 650, 47.38, 47.4, 47.41

[56] References Cited

U.S. PATENT DOCUMENTS

| | | | |
|---|---|---|---|
| 375,840 | 1/1888 | Stockton | 297/310 X |
| 606,451 | 6/1898 | English | 280/642 |
| 655,787 | 8/1900 | Leadbetter | 280/642 |
| 1,083,215 | 12/1913 | Lewis | 297/310 |
| 1,755,311 | 4/1930 | Bailey | 297/310 X |
| 3,101,972 | 8/1963 | Laughlin | 297/310 X |
| 3,269,768 | 8/1966 | Kinney | 297/68 |
| 3,873,116 | 3/1975 | Perego | 280/36 |
| 3,937,490 | 2/1976 | Nasr | 280/242 |
| 4,072,318 | 2/1978 | Laune | 280/42 |
| 4,272,100 | 6/1981 | Kassai | 280/650 |
| 4,339,013 | 7/1982 | Weigt | 180/6.5 |
| 4,391,453 | 7/1983 | Glaser | 280/47 |
| 4,412,688 | 1/1983 | Giordani | 280/642 |
| 4,462,607 | 7/1984 | Nakao et al. | 280/644 |
| 4,506,906 | 3/1985 | Alldén | 280/642 |
| 4,564,212 | 1/1986 | Orlandino et al. | 280/642 |

OTHER PUBLICATIONS

P. 152, Preston, "Equipment for Rehabilitation and Special Education", 1986-1987 Catalog Edition.

Primary Examiner—John J. Love
Assistant Examiner—Michael Mar
Attorney, Agent, or Firm—Heslin & Rothenberg

[57] ABSTRACT

A versatile, adjustable stroller for handicapped children, adolescents and adults is disclosed. The stroller includes a contoured seat removably positioned on an adjustable wheeled apparatus. The contoured seat is molded to provide proper anatomical alignment and support for an occupant and constructed so as to be positionable on any conventional seating surface when removed from the wheeled apparatus. The adjustable wheeled apparatus has a one-button adjustment mechanism which allows an attendant to vary the spatial orientation of a seated occupant while simultaneously, automatically adjusting the apparatus to maintain balanced support of the contoured seat and occupant. The stroller is preferrably constructed so as to be capable of traversing a wide variety of terrains and is collapsible for easy transport and/or storage.

29 Claims, 8 Drawing Figures

WHEELED SEAT CARRYING APPARATUS AND STROLLER FOR THE HANDICAPPED

BACKGROUND OF THE INVENTION

This invention relates generally to strollers for handicapped individuals and more particularly, to an adjustable wheeled apparatus designed to carry a seat support for a neurologically impaired child, adolescent or adult.

Neurologically impaired individuals suffer from injury, disease or disorder of the brain or nervous system. Two leading causes of neurological impairment, particularly in children and adolescents, are cerebral palsy and muscular dystrophy. Although the severity of such disorders will vary, in many cases the individuals suffer from characteristic symptoms such as partial or total loss of muscular control and motion, and partial loss of speech, hearing and reasoning abilities. Neurological impairment and its effects are discussed in some detail in a copending application entitled "Seat Support and Restraint System for the Handicapped," Ser. No. 874,032.

Briefly, neurological disorders especially in children and adolescents undergoing muscular and skeletal formation, often result in progressive body deformation. One method to assist in slowing the progressive nature of the disorder is to provide a support structure which properly anatomically aligns and supports an occupant. In particular, a support structure which properly anatomically aligns and supports an occupant facilitates the occupant's performance of daily living skills, assists in controlling or slowing the progress of muscular or skeletal deformities, and facilitates muscle and posture therapy. A first important characteristic, therefore, of any seat support for such a handicapped child, adolescent or adult, including a wheeled seat structure or stroller, is that the support surface be capable of properly anatomically aligning and supporting the body of the individual seated thereon.

Another desirable characteristic of a wheeled seat structure or stroller for such a handicapped individual is that an adjustment mechanism be provided for convenient variation of the spatial orientation of the seated occupant without concomitant change in the occupant's anatomical alignment. By being able to change the spatial orientation of the occupant, certain muscle groups may be selectively relaxed or stressed with therapeutic results. The adjustment mechanism is preferably capable of being easily actuated by an individual attending to the stroller even while the occupant remains seated thereon.

A further desirable characteristic of a wheeled seat structure or stroller for such a handicapped individual is that it be ruggedly constructed to traverse a wide variety of terrains and be capable of supporting individuals of varying size and weight. Balanced against these characteristics is a desire that the stroller be easily transportable and storable when not in use. Most, if not all, presently available wheeled support structures or strollers for handicapped individuals fail to adequately include the above preferred characteristics.

A standard wheelchair is perhaps the most common wheeled support structure for handicapped individuals. Although wheelchairs are commonly designed to be readily adaptable to accommodate individuals of different sizes and shape, they often lack the contoured support needed to properly anatomically align and support the occupant. Further, standard wheelchairs frequently have complicated adjustment mechanisms in order to accommodate individuals of different size and weight, and fail to provide any means for varying the spatial orientation of the occupant without disturbing a therapeutically desired seating posture. Lastly, standard wheelchairs by their design and construction are usually restricted as to the type of terrain which can be traversed. For example, they typically have relatively small swivel wheels or coasters secured to their lower front end for mobility, which, because of their size often act as a limitation on the mobility of the wheelchair.

Another type of wheeled support structure, although not specifically designed for handicapped individuals, is a baby stroller. A wide variety of baby strollers are presently available, however, none appear to satisfactorily combine the above desirable characteristics of a wheeled seat support or stroller for a handicapped individual. Baby strollers are designed to function primarily as wheeled structures for babies and small children. Therefore, such strollers are usually engineered to be of a light construction and often include intricate adjustment or collapsment mechanisms which would be unduly cumbersome if enlarged to the size necessary for a wheeled support structure or stroller for an adolescent or adult. Lastly, baby strollers generally lack any contoured support such as that needed to properly anatomically align and support a handicapped individual.

Thus, there presently exists a geniune need for a wheeled support structure or stroller capable of properly anatomically aligning and supporting a seated occupant and capable of being adjusted to vary the spatial orientation of the occupant, which is sufficiently rugged to traverse a wide variety of terrains and yet easily transportable and storable when not in use.

SUMMARY OF THE INVENTION

Accordingly, a principal object of the present invention is to provide a wheeled support structure or stroller capable of properly anatomically aligning and supporting a seated occupant.

Another object of the present invention is to provide a wheeled support structure or stroller capable of being easily adjusted to change the spatial orientation of a seated occupant without concomitant change in the occupant's anatomical alignment.

Yet another object of the present invention is to provide a durable, rigid, wheeled support structure or stroller which is capable of traversing a wide variety of terrains.

Still another object of the present invention is to provide a stroller which includes a removable contoured chair or seat capable of being used separately therefrom on any conventional seating surface.

A further object of the present invention is to provide a stroller which has a simple yet effective occupant suspension system.

A yet further object of the present invention is to provide a wheeled support structure or stroller which is capable of being safely adjusted in a secure manner with an individual seated thereon.

A still further object of the present invention is to provide a wheeled support structure or stroller which is collapsible for easy transport and/or storage.

The present invention satisfies these objects by providing in one aspect an adjustable wheeled apparatus for carrying a contoured seat and in another aspect a stroller having a contoured seat specially designed for handicapped individuals and removably positionable on the adjustable wheeled apparatus. In the first aspect, the adjustable wheeled apparatus includes a first frame having two side members interconnected by first support means for supporting a contoured chair. Intermediate the top and bottom ends of each side member is a pair of downwardly extending parallel plates which each define a receiving channel. One of the parallel plates includes at least two holes aligned in an arc-shaped configuration. Wheels are rotatably connected near the bottom end of the first frame on each side.

Pivotally secured to each downwardly extending parallel plate pair is a second frame. The second frame is substantially U-shaped and is secured to the first frame such that its free ends reside within the receiving channels defined by the parallel plate pairs. The second frame includes an externally protruding spring biased peg near one free end which is positioned to selectively engage the holes aligned in the arc-shaped configuration in the one parallel plate. Wheels are also rotatably secured to each side of the second frame near its bottom end.

The second frame is locked in position relative to the first frame when the spring biased peg engages one of the holes arranged in the arc-shaped configuration in the one parallel plate and the angle at which the axis of the second frame intersects the axis of the first frame is selectively varied by moving the spring biased peg such that the peg engages a different one of the holes. The distance between the wheels secured to the first frame and the wheels secured to the second frame is simultaneously, automatically changed in predefined ratio to variation in the angle at which the axis of the second frame meets the axis of the first frame.

In the second aspect of the present invention, a contoured seat or chair is provided which is removably positioned on the adjustable wheeled apparatus. The contoured chair preferably has a rigid internal structure surrounded by a molded foam exterior. The chair is molded so as to provide proper anatomical alignment and support for a seated occupant and may be used on any conventional seating surface. When the contoured chair is positioned on the adjustable wheeled apparatus, the spatial orientation of a seated occupant is simultaneously, automatically changed in predefined relation to variation in the angle at which the axis of the second frame intersects the axis of the first frame.

BRIEF DESCRIPTION OF THE DRAWINGS

While the specification concludes with claims particularly pointing out and distinctly claiming the present invention, the objects, features, and advantages of the present invention can be more readily ascertained from the following detailed description of one preferred embodiment when read in conjunction with the accompanying drawings in which:

DETAILED DESCRIPTION OF THE INVENTION

Figure 1:
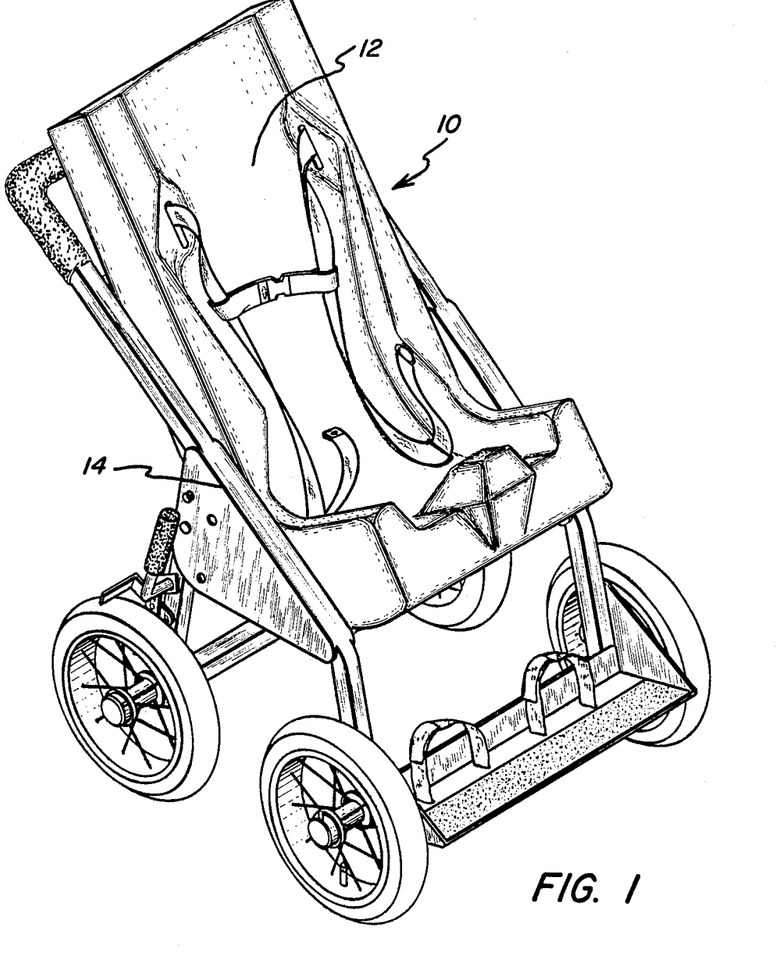
FIG. 1 is a perspective view of one embodiment of a stroller of the present invention.

One preferred embodiment of the stroller of the present invention, generally denoted 10, is shown perspectively in FIG. 1. Stroller 10 includes a contoured chair or seat 12 positioned upon a wheeled apparatus 14. As discussed further below, contoured chair 12 is designed to properly anatomically align and support an individual or occupant seated thereon. Also, in addition to providing mobility, wheeled apparatus 14 is specially designed for handicapped children, adolescents and adults. For example, a one-button mechanism allows an attendant to adjust the spatial orientation of chair 12 while an occupant is seated thereon, which simultaneously, automatically adjusts the distance between the front wheels and back wheels in a predefined relation to provide continued proper balanced support for chair 12 and its occupant. Relatively large pneumatic or foam tires serve in part to allow wheeled apparatus 14 to easily traverse a wide variety of terrains while also functioning as a type of suspension. Lastly, wheeled apparatus 14 is designed so that there are no exposed edges or pivoting mechanisms upon which a seated occupant could be injured. Each of these features, and others, is discussed in detail below.

Figure 2:
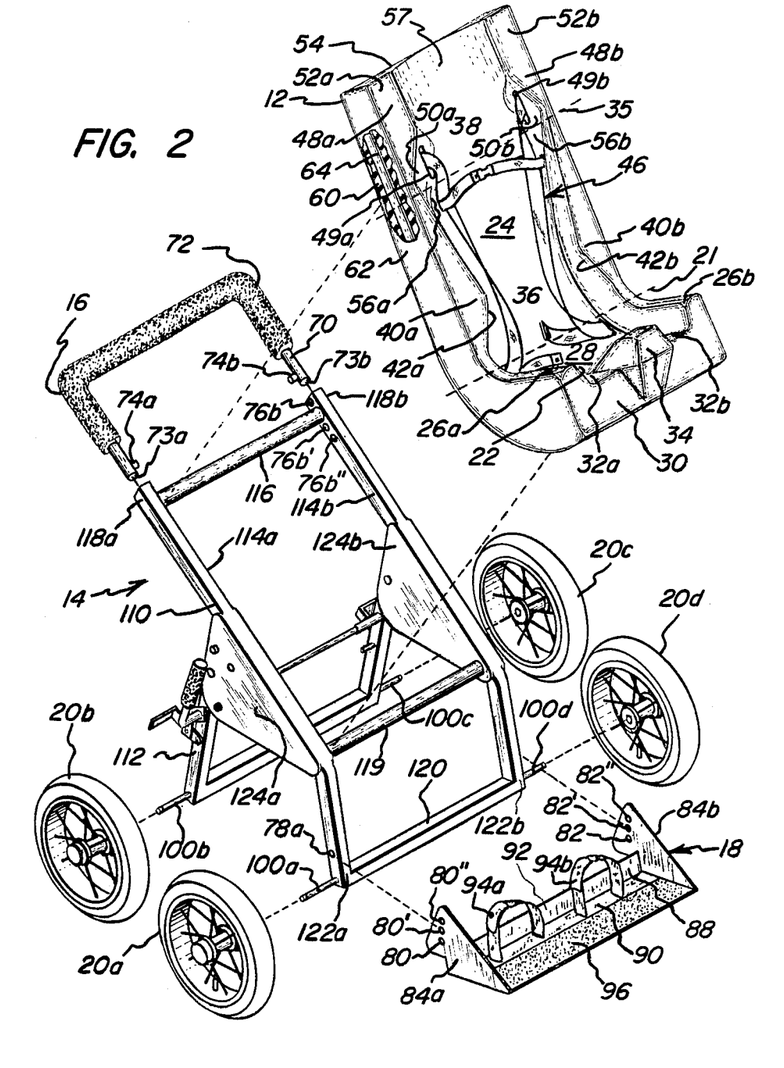
FIG. 2 is an exploded perspective view of the stroller of FIG. 1.

As shown in FIG. 2, contoured chair or seat 12 is removable from wheeled apparatus 14. In addition to being convenient for storage and transport, this removability aspect allows the chair to be used separate from wheeled apparatus 14, e.g., on any conventional seating structure (not shown), in the course of daily living activities in the home or classroom. Wheeled apparatus 14 also includes a removable handle 16, a removable footrest 18 and removable wheel assemblies 20a, 20b, 20c and 20d.

Contoured chair 12 will first be described. Central to the design of chair 12 is the principle that proper anatomical alignment and support of a seated occupant is obtained by building from a sound foundation, the foundation being a firmly planted and properly positioned pelvis. In an upward direction from the occupant's pelvis, proper muscle and skeletal alignment is largely accomplished by the back portion of contoured chair and in a downward direction by the base portion of contoured chair 12. For convenience of description, contoured chair 12 is divided into base portion 22 and back portion 24 by an imaginary line 21 running laterally across chair 12. Base portion 22 and back portion 24 meet in a continuous manner along imaginary line 21 in that there is no sharp division or surface relief feature between them. Base portion 22 simply flows smoothly into back portion 24.

Base portion 22 has a first pair of side walls 26a and 26b of substantially the same height and width. The height and width of side walls 26a and 26b are sufficient to effectively position and secure an occupant's pelvis in a lateral direction and maintain an occupant's thighs in an adducted position. Each inner surface of the first pair of side walls preferably slopes inwardly and downwardly to a seating surface 28. Near the front edge 30 of contoured chair 12, a pair of troughs 32a and 32b partially defined and separated by a rounded central ridge 34, are provided to support an occupant's thighs in an abducted position.

Again for convenience of description, back portion 24 is divided into a lower section 36 and an upper section 38 by an imaginary line 35 running laterally across back portion 24. As before, there are no sharp divisions or surface relief features between lower section 36 and upper section 38, they simply flow smoothly into one another. Lower section 36 has a second pair of side walls 40a and 40b continuous with and substantially the same height as first pair of side walls 26a and 26b, respectively. Each side wall of said second pair has substantially the same width; the width of said second pair of walls being larger than the width of said first pair of side walls in base portion 24. Each side wall in the second pair has an inner surface 42a and 42b which inwardly curves such that contact and control over a seated occupant's trunk is maximized. Second pair of side walls 40a and 40b are designed and constructed to properly position and retain an occupant's trunk at midline. Shoulder/trunk and lap belt 46 may be used to ensure maintenance of an occupant's trunk at midline position relative to back portion 24. Belt 46 is preferably self-adjusting around the occupant's upper body or shoulder area. This is accomplished by allowing the top portion of belt 46 to move freely within vertically extending slots 49a and 49b such that belt 46 is capable of automatically adjusting vertically to occupants of different height.

Upper section 38 of back portion 24 has a third pair of side walls 48a and 48b continuous with and substantially the same height as second pair of side walls 40a and 40b, respectively. Each side wall of the third pair 48a and 48b has substantially the same width. The width of each wall of the third pair 48a and 48b is reduced near imaginary line 35 to define substantially identical portions 50a and 50b which function as receiving areas for the occupant's shoulders, and is enlarged near the top 54 of contoured chair 12 to define substantially identical enlarged portions 52a and 52b in opposed relation to one another. The inner surfaces 56a and 56b of said third pair of side wall portions 50a and 50b gradually curve inwardly to matably engage the occupant's upper back and shoulder area in such a way as to slightly protract the occupant's shoulders for increased comfort and posture control over the upper body. Enlarged portions 52a and 52b of third pair of side walls 48a and 48b each have an inner surface which inwardly slopes and meets the other to form a central cradle 57 for receiving an occupant's head and neck.

Preferably, contoured chair 12 is molded of a resilient, relatively soft, foam material 60 and provided with a durable seamless exterior covering 62 manufactured, e.g., of a rubber based compound. The exterior covering is designed such that all internal structure is fully encased, in part for the occupant's protection. An internal frame 64 provides a support structure for molded foam exterior 60. By including internal frame 64 within chair 12, wheeled apparatus 14 is able to be constructed with chair support means having a limited area of contact with contoured chair 12, thereby helping to reduce the weight of wheeled apparatus 14. Internal frame 64 also allows contoured chair 12 to independently maintain structural integrity when used apart from wheeled apparatus 14 on any conventional seating surface. In addition to being contoured to continually properly anatomically align and support a seated occupant, molded soft foam 60 operates as a second type of suspension when chair 12 is positioned on wheeled apparatus 14 for traveling. Because of chair 12 and its ability to act as a type of suspension, wheeled apparatus 14 is constructed with few moving parts to be the relatively simple, durable, rigid frame structure noted above and described further below.

As briefly discussed above, wheeled apparatus 14 includes removable handle bar 16, footrest 18 and wheel assemblies 20a, 20b, 20c and 20d. Handle bar 16 comprises a substantially U-shaped bar 70 shaped to engage the top end of wheeled apparatus 14. U-shaped bar 70 is substantially covered by a closed cell sponge rubber handgrip material 72 which assists an attendant in controlling stroller 10. In the preferred embodiment, handle 16 is capable of being telescopically adjusted between a retracted position and at least one extended position. The retracted setting results in a compact apparatus 14 which is more easily positioned when limited area is available, e.g. on a school bus, while the extended setting (or settings) facilitates more convenient operation of apparatus 14 by the attending individual when stroller 10 is used for traveling. A spring biased peg 74a and 74b at each end 73a and 73b of U-shaped bar 70 is positioned to detachably, selectively engage one set of a series of corresponding hole pairs 76a (not shown), 76b, 76a' (not shown), 76b' and 76a" (not shown), 76b" respectively, at each side in the top end of wheeled apparatus 14. Spring biased peg 74a and 74b may comprise a snap button such as that manufactured by Valco-Valley Tool & Die, Inc. and marketed as a "Valco" Snap Button, Model No. A-180.

Two spring biased pegs 78a and 78b (not shown) (e.g., "Valco" Snap Buttons, Model No. A-1905) are located at the lower front end of wheeled apparatus 14 to selectively engage one of a plurality of vertically spaced holes 80, 80',80" and 82, 82' and 82" in side walls 84a and 84b, respectively, of removable footrest 18 such that the vertical position of footrest 18 may be selectively varied to accommodate occupant's of various sizes. Footrest 18 includes a support surface 88 of a substantially L-shaped cross section having a horizontal flat surface 90 and a vertical back plate 92. When seated in the stroller, the occupant's feet are supported on horizontal flat surface 90 and rest against and are positioned by back plate 92. Straps 94a and 94b, capable of adjustably securing the occupant's feet in a particular position on footrest 18, are positioned through appropriately sized slots in horizontal flat surface 90. A granular surface 96 is also preferably included on horizontal flat surface 90 to provide improved traction and grip under the occupant's feet.

Figures 3, 4:
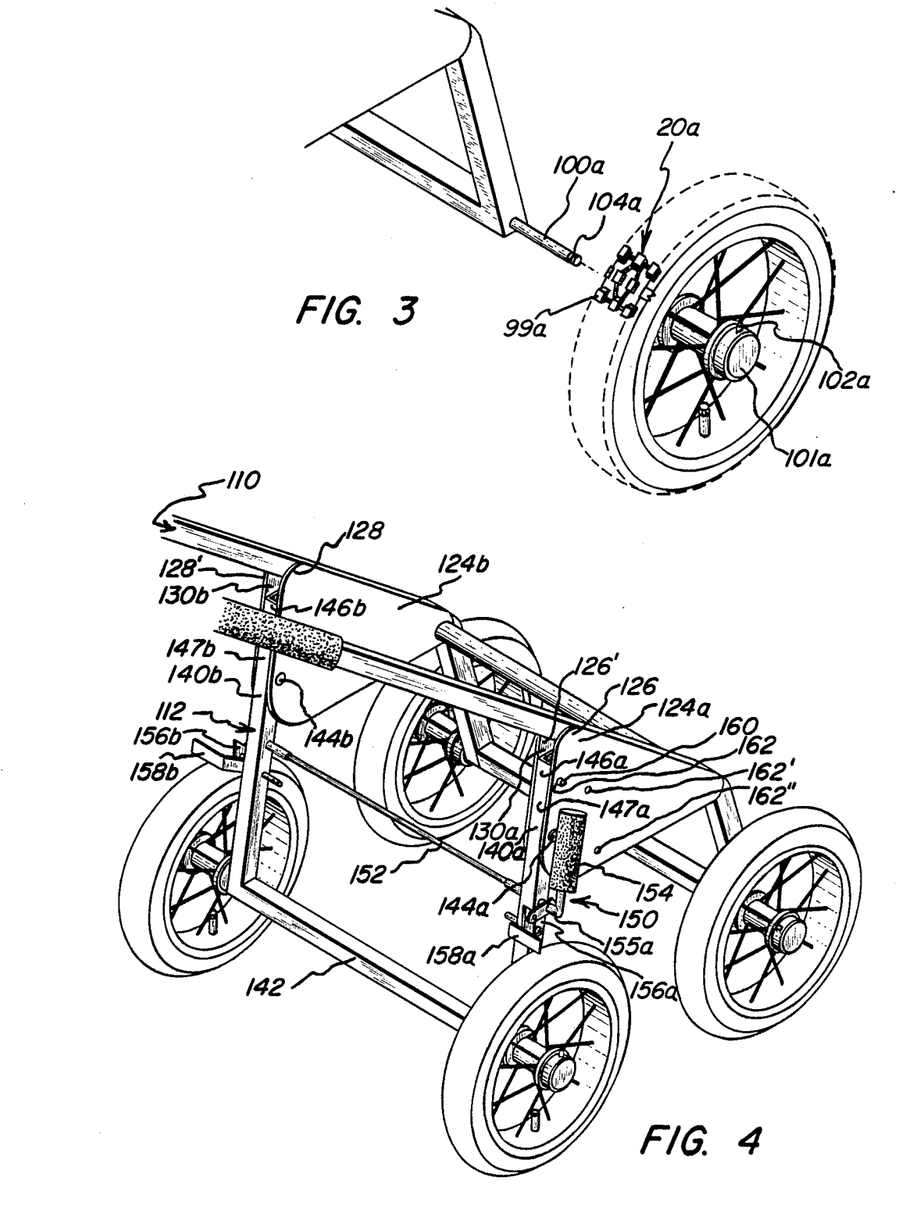
FIG. 3 is an enlarged perspective view of one wheel assembly shown in FIG. 2.
FIG. 4 is a partial perspective view of the adjustable wheeled apparatus of FIG. 2.

Removable wheel assemblies 20a, 20b, 20c and 20d are identical and therefore only one will be described in detail. Referring to FIG. 3, wheel 20a includes a pneumatic (or foam) tire 99a sufficiently large to traverse a wide variety of terrains. Such a pneumatic tire is commercially available and typically marketed as a miniature bicycle wheel. Pneumatic tire 99a is positioned on a standard locking wheel hub 101a. Wheel 20a is secured to apparatus 14 on an outwardly protruding axle stud 100a by a spring biased tab 102a included within locking wheel hub 101a and positioned to engage a channel 104a cut circumferentially in axle stud 100a. Wheel 20a is secured to axle 100a by holding tab 102a down while sliding the wheel onto the axle, releasing the tab once the wheel is fully inserted onto the axle and pulling slightly to ensure tab 102a is engaging channel 104a. Conversely, wheel 20a is removed from axle 100a by holding tab 102a down to retract tab 102a from channel 104a and pulling the wheel clear of the axle. As shown in FIG. 2, axle studs 100a, 100b, 100c and 100d are fixedly secured to the lower ends of apparatus 14. Alternative to the provision of axle studs 100a, 100b, 100c and 100d, two transverse axles (not shown) could be utilized, one transverse axle for wheels 20a and 20d and the other for wheels 20b and 20c. Lastly, it will be observed for reasons of durability and mobility, wheel assemblies 20a, 20b, 20c and 20d rotate but do not pivot about axle studs 100a, 100b, 100c and 100d, respectively. Pivoting of apparatus 14 is accomplished when it is in an upright, or travel, position (discussed below) by tilting apparatus 14 backwards onto wheel assemblies 20b and 20c and turning it as desired.

The main frame of wheeled apparatus 14 will now be described. As shown in FIG. 2, apparatus 14 includes a first or front frame 110 and a second or back frame 112. Frames 110 and 112 may be constructed of any combination of one of many commercially available hollow tubes and solid bars of various cross-sectional shapes, e.g., circular or rectangular shaped. First frame 110 has two side members 114a and 114b spaced apart and interconnected by a top back support arm 116 near the upper end 118a and 118b of each side member 114a and 114b, respectively; a front base support arm 119 intermediate the upper and lower ends of side members 114a and 114b; and a bottom arm 120 secured near the bottom 122a and 122b of each side member 114a and 114b, respectively. Top back support arm 116 and front base support arm 119 are positioned so as to cooperate to either fully or partially support contoured chair 12 on wheeled apparatus 14. In the preferred embodiment, front base support arm 119 will serve as a fixed reference point for the positioning of contoured chair 12. For example, it may be desirable during the manufacturing process to fix the spatial orientation of chair 12 at 20° from a true perpendicular orientation when apparatus 14 is in its upright position (discussed below). This is accomplished by proper positioning of top back support arm 116 relative to front base support arm 119 for each size chair 12 constructed. Rather than being secured at one location, top back support arm 119 can alternately be spring biased so as to be capable of being selectively positioned in any one of a number of hole sets (not shown) in first frame side members 114a and 114b so that the desired 20° orientation (when apparatus 14 is in an upright position) can be obtained for any of a number of different size chairs to be positioned on apparatus 14.

Also located intermediate the top and bottom ends of each side member 114a and 114b is a pair of downwardly extending parallel plates 124a and 124b. As best shown in FIG. 4, each parallel plate pair 124a and 124b comprises two substantially parallel plates of similar design 126, 126' and 128, 128', respectively. Each parallel plate pair 124a and 124b defines a receiving channel 130a and 130b within which a portion of second frame 112 resides when connected to first frame 110 as discussed below. Second frame 112 comprises two parallel side members or bars 140a and 140b which are interconnected in fixed relation by a bottom arm or bar 142 such that second frame 112 is rigid and has a substantially U-shape. Second frame 112 is pivotally connected to first frame 110 at pivot points 144a and 144b within receiving channels 130a and 130i b defined by parallel plate pairs 124a and 124b, respectively, such that the free ends 146a and 146b of side bars 140a and 140b reside within said channels in addition to adjacent portions 147a and 147b of bars 140a and 140b, respectively. As described further below, bars 140a and 140b are locked in position within receiving channels 130a and 130b by a single biased peg 160 engaging one of a plurality of holes in a parallel plate 126. Only a single adjusting peg is needed because of the fixed, U-shaped design of second frame 112.

As shown, a manually actuated brake mechanism generally denoted 150 is provided for locking apparatus 14 against unwanted movement. Brake mechanism 150 includes: a transverse axle 152 rotatably secured through each side bar 140a and 140b of second frame 112; a handle 154 fixedly secured to one end 155a or 155b (not shown) of transverse axle 152; a standardly constructed pivoting locking arm assembly 156a and 156b secured to each end 155a and 155b of transverse axle 152; and a wheel engaging member or arm 158a and 158b secured to each pivoting arm assembly 156a and 156b, moving handle 154 an attendant or occupant is able to rotate transverse axle 152 to either raise or lower engaging arms 158a and 158b from contact with or to forcibly contact the pneumatic tires of wheels 20b or 20c respectively, via pivoting mechanisms 156a and 156b. Brake mechanism 150 is shown in a raised position in FIG. 5A and in a lowered or locked position in FIG. 5B. If desired, transverse axle 152 of brake mechanism 150 can function as a back base support arm which operates in association with top back support arm 116 and front base support arm 119 of first frame 110 to support contoured chair 12 on wheeled apparatus 14.

Adjustment of second frame 112 relative to first frame 110 will initially be described with reference to FIG. 4. As shown, spring biased peg or snap button 160 is provided near one free end 146a of a side bar 140a to selectively engage one of a plurality of holes 162, 162' and 162" arranged in an arc-shaped configuration in one plate 126 of a parallel plate pair 124a. It should be understood that the spring biased peg or snap button may alternately be provided at side bar 140b and the holes arranged in the arc-shaped configuration may be provided in any corresponding plate in the parallel plate pairs. As noted above, second frame 112 is locked in a particular position relative to first frame 110 when snap button 160 engages one of the plurality of holes, i.e., 162, 162' or 162".

Figure 5A:
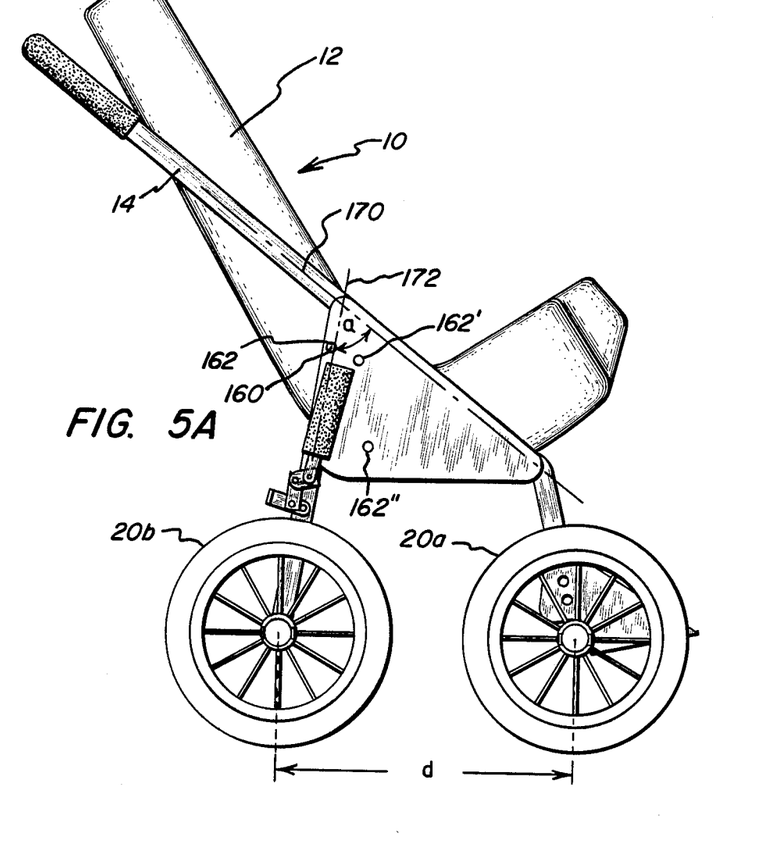
FIG. 5A and 5B are side elevational views of the stroller of FIG. 1 shown in different operational positions.
Figure 5B:
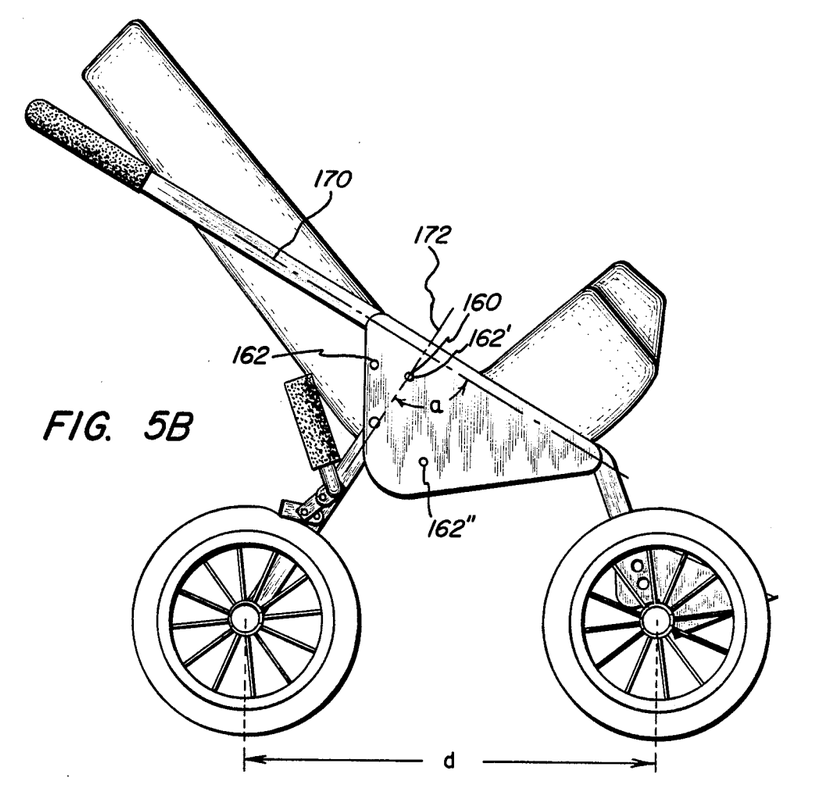

Referring to FIGS. 5A and 5B, when peg 160 is positioned within a receiving hole 162 or 162', a particular angle "a" is defined by the axis 170 of first frame side member 114a and an extrapolation of the axis 172 of second frame side bar 140a. Stroller 10 is shown in an upright or travel position in FIG. 5A with peg 160 engaging hole 162 and in a reclined or resting position in FIG. 5B with peg 160 engaging hole 162'. As shown angle "a" increases from a certain acute angle value when stroller 10 is in an upright position to a larger, not necessarily acute, value when stroller 10 is in a reclined position. The spatial orientation of contoured chair 12 and thus of a seated occupant varies in relation to changes in angle "a". The angle "a" at which first frame 110 and second frame 112 meet is adjusted by moving spring biased peg 160 to engage a different hole 162 or 162'. In addition to providing a simple mechanism for varying the spatial orientation of a seated occupant, the distance "d" between wheels 20a and 20d secured to first frame 110 and wheels 20b and 20c secured to second frame 112 is simultaneously, automatically varied in relation to a change in angle "a" such that contoured chair 12 is properly supported in whatever spatial orientation is desired. In an upright position, the shorter wheelbase distance "d" facilitates pivotal steering of apparatus 14 about wheels 20b and 20c by centering the occupants' weight above these wheels. In a reclined position, the longer wheelbase distance "d" increases stability by better distributing the occupants' weight, thereby lessening the chance that stroller 10 could tip over if left unattended. Also note that whatever spatial orientation contoured chair 12 is in, the occupant's body position is unaffected, i.e., the occupant continues to be properly anatomically supported. Multiple spatial orientations can be provided for by adding additional holes in the arc-shaped configuration in parallel plate 126 for engagement by spring biased peg 160.

With the present invention, adjustment of the spatial orientation of chair 12 can be undertaken with an occupant seated thereon. A reduced chance of collapsing apparatus 14 while an occupant is positioned thereon is obtained by limiting the operational adjustments of biased peg 160 to a few holes, e.g. 162 and 162', which are close to the line of downward force generated by the occupant's weight. When in operation, an attendant changes the spatial orientation of contoured chair 12 by first locking the brake assembly then grasping handle 16 with one hand, pressing spring biased peg 160 in with the other and moving second frame 112 in the desired direction relative to first frame 110 either by pushing down on handle 16 or pushing in on second frame 112 with a foot.

Figure 6:
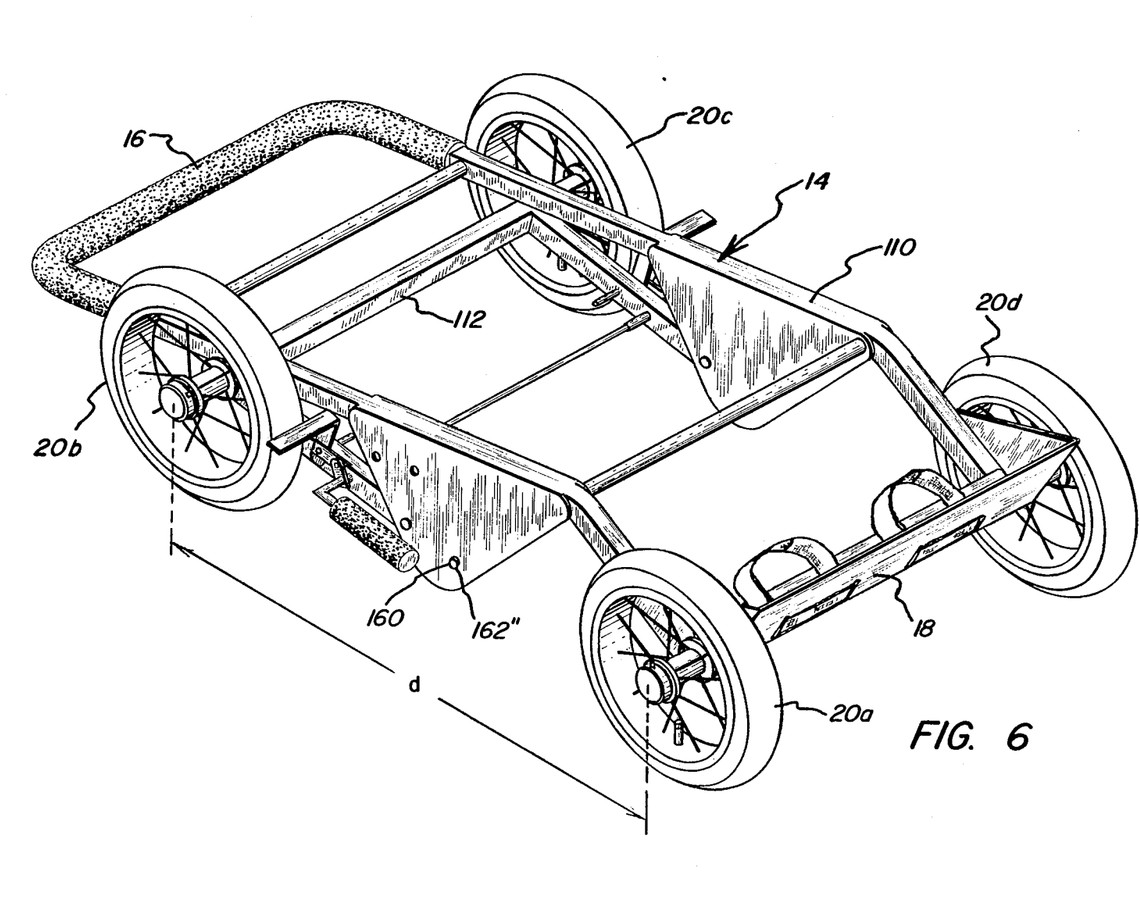
FIG. 6 is a perspective view of the adjustable wheeled apparatus of FIG. 2 shown in a collapsed position and FIG. 7 is a perspective view of one alternate embodiment of the stroller of the present invention.

Wheeled apparatus 14 is shown in a collapsed, locked position for transport or storage in FIG. 6. Contoured chair 12 (not shown) is removed from wheeled apparatus 14 and transported or stored or used separately therefrom. When wheeled apparatus 14 is in a collapsed position, the distance "d" between wheels 20a and 20d secured to first frame 110 and wheels 20b and 20c secured to second frame 112 is greatest. Apparatus 14 is locked in the collapsed position when biased peg 160 engages hole 162". Collapsed apparatus 14 is easily set up by first pressing in peg 160, then grasping and lifting handle 16 with one hand while pushing second frame 112 in a downward and inward direction. Similarly, apparatus 14 is easily collapsed from an operational position by pressing peg 160 inwardly and pushing handle 16 downward. As mentioned earlier, handle 16, footrest 18 and wheels 20a, 20b, 20c and 20d are removable if desired for storage or transport. In addition, footrest 18 is pivotable about pegs 78a and 78b (see FIG. 2) if desired for a more compact storage of apparatus 14.

Figure 7:
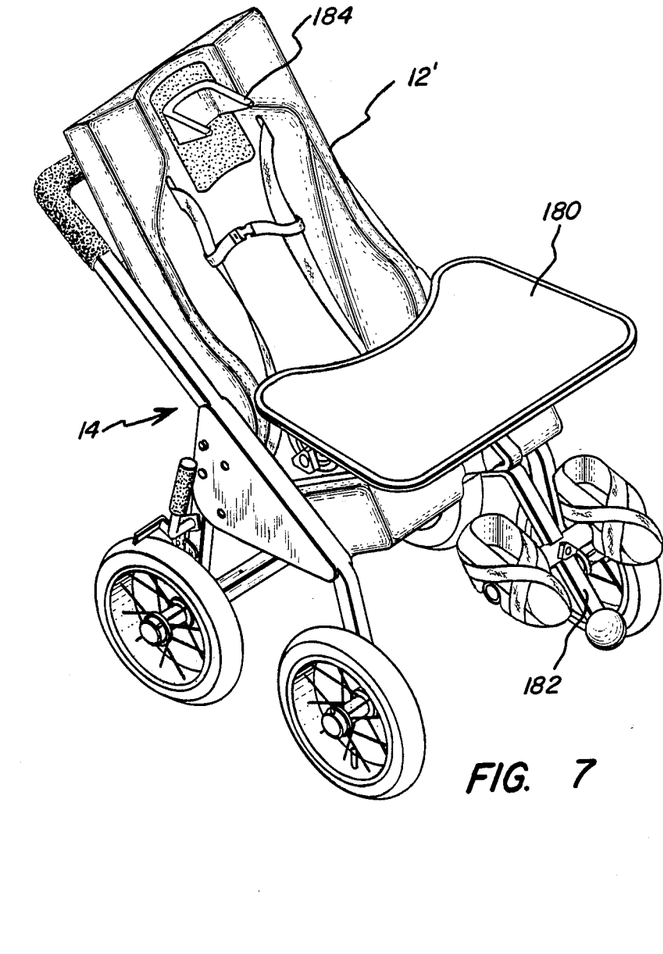

One alternate embodiment of a contoured chair 12' is shown positioned on a wheeled apparatus 14' in FIG. 7. This embodiment of contoured chair 12' is described in a copending patent application entitled "Seat Support and Restraint System For The Handicapped", Ser. No. 874,032, the contents of which are hereby incorporated herein by reference. In this embodiment, contoured chair 12' includes an adjustable tray assembly 180, an adjustable footrest assembly 182 and an adjustable headrest 184. Footrest 18 (not shown) is removed from wheeled apparatus 14' since contoured chair 12' includes its own adjustable footrest assembly 182. Also, bottom arm 120 (not shown) discussed above in connection with apparatus 14 is omitted from wheeled apparatus 14' so as not to interfere with this footrest assembly 182.

With either embodiment of the wheeled apparatus and contoured chair, add on belts or straps (not shown) can be provided if desired for facilitating securement of the stroller and occupant positioned thereon, within a motor vehicle such as a school bus or van for transport. For example, a lap belt designed in accordance with federal standards can be provided secured to each side of the wheeled apparatus so as to extend around an occupant's lap. The chair would also preferably be secured to the apparatus by means of a tether strap near its upper back portion in any conventional manner. Lastly, fastening belts would be provided secured at one end to the floor of the school bus or van and at the other designed to detachably secure the apparatus in a fixed position by tautly engaging each wheel assembly, wheel axle or corresponding cross-member so as to prevent movement of the apparatus. Such an assembly of add on belts or straps would accomplish the safety objective of securing the occupant to the chair, the chair to the wheeled apparatus, and the wheeled apparatus to the school bus or van. It will be noted from the above that this invention fully meets the objectives set forth. A stroller including a contoured chair capable of properly anatomically aligning and supporting a seated occupant is provided. In addition, the stroller includes an adjustable wheeled apparatus which provides for easy adjustment in the spatial orientation of a seated occupant, is capable of traversing a wide variety of terrains and is collapsible for easy transport and/or storage. Lastly, it will be observed that the contoured chair may be removed from the wheeled apparatus and used separately therefrom on any conventional seating surface.

Although one embodiment has been illustrated in the accompanying drawings and described in the foregoing detailed description, it will be understood that the invention is not limited to the particular embodiments discussed but is capable of numerous rearrangements, modifications and substitutions without departing from the scope of the invention. The following claims are intended to encompass all such modifications.

I claim:

1. Adjustable wheeled apparatus for carrying a contoured seat for a handicapped individual, said adjustable wheeled apparatus comprising:

a first frame having two side members, said side members each having a top end and a bottom end, said bottom end of each side member having a wheel rotatably secured thereto, each of said side members having a pair of substantially parallel plates extending therefrom in a downward direction intermediate its ends at substantially the same height above said wheel rotatably secured to said bottom end of each side member, said parallel plate pairs each defining a receiving channel, at least two holes being aligned in at least one of said extending plates, said side members being interconnected by first support means for supporting said contoured seat;

a second frame comprising a base bar and two side bars extending therefrom such that said second frame is substantially U-shaped, each of said side bars having at least one free end, one of said side bars having an externally protruding spring-biased peg near its free end, said second frame having a wheel rotatably secured thereto on each side near said base bar; and each of said second frame side bars being pivotally connected to one of said parallel plate pairs extending from said first frame side members such that a portion of each of said side bars adjacent said free end resides within one of said receiving channels, and said spring-biased peg is movable about an arc shaped path for selective engagement with said aligned holes in said one extending plate, and said second frame is locked in position relative to said first frame when said peg engages one of said holes, whereby the angle at which the axis of said second frame intersects the axis of said first frame may be selectively varied by moving said spring-biased peg such that said peg engages a different one of said aligned holes and the distance between said wheels secured to said first frame and said wheels secured to said second frame varies in relation to said angle defined by the axis of said first frame and the axis of said second frame.

2. The adjustable wheeled apparatus of claim 1, wherein said apparatus is collapsible for convenient storage and transport.

3. The adjustable wheeled apparatus of claim 2, wherein the distance between said wheels secured to said first frame and said wheels secured to said second frame is greatest when said apparatus is in a collapsed state.

4. The adjustable wheeled apparatus of claim 3, wherein said wheels secured to said first frame and said wheels secured to said second frame include pneumatic tires.

5. The adjustable wheeled apparatus of claim 4, further comprising second support means interconnecting said side bars of said second frame for supporting said contoured seat in association with said first support means.

6. The adjustable wheeled apparatus of claim 5, wherein said first support means comprises a top back support arm and a front base support arm and wherein said second support means comprises a back base support arm.

7. The adjustable wheeled apparatus of claim 6, further comprising a manually actuated brake mechanism for locking said wheels against movement.

8. The adjustable wheeled apparatus of claim 7, wherein said brake mechanism includes a handle portion secured to a transverse axle rotatably connected to said side bars of said second frame, said transverse axle having a tab structure responsively secured to each end such that said tab structures are capable of selective engagement with said wheels secured at said second frame, whereby said apparatus may be locked against unwanted movement by manually moving said handle such that said tabs securely engage said tires of said wheels secured to said second frame.

9. The adjustable wheeled apparatus of claim 8, wherein said back base support arm comprises said transverse axle of said brake mechanism.

10. The adjustable wheeled apparatus of claim 3, further comprising a removable handle bar secured to said first frame at said top ends of said side members.

11. The adjustable wheeled apparatus of claim 10, further comprising a footrest secured to said side members of said first frame near said bottom ends.

12. The adjustable wheeled apparatus of claim 11, wherein said footrest is adjustable relative to said side members and removable from said side members.

13. The adjustable wheeled apparatus of claim 12, further comprising first axle means positioned at each bottom end of said first frame side members and second axle means positioned at each side of said second frame near said base bar, and wherein said first frame wheels are removably secured to said first axle means and said second frame wheels are removably secured to said second axle means.

14. The adjustable wheeled apparatus of claim 13, in combination with a contoured seat for handicapped individuals, said contoured seat being removably positioned to rest against said first support means such that the spatial orientation of said contoured seat varies in relation to said angle at which the axis of said first frame intersects the axis of said second frame.

15. The adjustable wheeled apparatus and contoured seat combination of claim 14 wherein said seat is manufactured of a resilient foam material such as to function as a type of occupant suspension.

16. The adjustable wheeled apparatus and contoured seat combination of claim 15, further comprising an automatically adjustable belt assembly secured to said contoured seat for restraining and positioning an occupant's body within said contoured seat.

17. A stroller for a handicapped individual, said stroller comprising:
a contoured seat having a rigid internal structure surrounded by a molded foam exterior, said molded foam exterior defining a base support surface and a back support surface, said base and back support surfaces being substantially continuous;
a front frame having an upper end and a lower end and two side members, said side members each having a pair of substantially parallel plates extending downwardly intermediate said upper and lower front frame ends, said parallel plate pairs each defining a receiving channel, at least two holes being aligned in at least one of said extending plates, said front frame also having first support means for supporting said contoured seat and a first pair of wheels rotatably secured thereto at said lower end;
a back frame having a bottom bar and two side bars, said back frame being pivotally connected to said front frame parallel plate pairs such that portions of said side bars adjacent their top ends reside within said receiving channels, said back frame also having a second pair of wheels rotatably secured thereto near said bottom bar and an externally protruding spring biased peg near the top end of a least one of said side bars, said spring-biased peg being movable about an arc shaped path for selective engagement with said aligned holes such that said back frame is locked in position relative to said front frame when said peg engages one of said holes, whereby by moving said spring-biased peg to engage a different one of said aligned holes the angle at which the axis of said back frame intersects the axis of said front frame, the spatial orientation of said contoured seat, and the distance between said first pair of wheels and said second pair of wheels, change in a predefined relation.

18. The adjustable stroller of claim 17, wherein said contoured seat is removable from said first support means and capable of use apart from said stroller on any conventional seating surface.

19. The adjustable stroller of claim 18, wherein:
said contoured seat base support surface has a first pair of side walls for positioning an occupant's pelvis and maintaining an occupant's thighs in an adducted position, and has a seating surface including a rearward section and a forward section, said rearward section for receiving an occupant's buttocks, said forward section having a pair of troughs running forwardly from the rearward section separated by a central ridge for supporting an occupant's thighs in an abducted position; and said contoured seat back support surface includes a lower section and an upper section, said lower section having a second pair of side walls for orienting an occupant's trunk to midline and having inwardly sloping surfaces from said second pair of sidewalls for matable engagement with an occupant's trunk, said upper section having a third pair of side walls continuous with said second pair of side walls, each side wall of said third pair terminating in an enlarged portion in opposed relation to the other, said opposed enlarged portions defining a central cradle for receiving an occupant's neck and head, said upper section further having gradually inwardly sloping surfaces from said third pair of side walls for matable engagement with and slight inwardly curving of an occupant's shoulders.

20. The adjustable stroller of claim 19, further comprising an adjustable tray assembly detachably securable to said contoured seat.

21. The adjustable stroller of claim 20, further comprising means for strapping said contoured seat to one of said front frame and said back frame.

22. The adjustable stroller of claim 21, further comprising an adjustable belt assembly capable of being secured to said contoured seat for restraining and positioning an occupant's body within said contoured seat.

23. The adjustable stroller of claim 18, wherein said stroller is collapsible for convenient storage and transport.

24. The adjustable stroller of claim 23, wherein the distance between the said first pair of wheels and said second pair of wheels is greatest when said stroller is in a collapsed position.

25. The adjustable stroller of claim 24, wherein said first pair of wheels and second pair of wheels include pneumatic tires.

26. The adjustable stroller of claim 25, further comprising a manually actuated brake mechanism for locking said wheels against movement.

27. The adjustable stroller of claim 26, wherein said brake mechanism includes a handle fixedly secured to an axle rotatably secured transverse said back frame, said transverse axle having a horizontally protruding arm responsively secured to each end such that said arms are selectively engageable with said second pair of wheels, whereby said stroller is locked against movement by manually positioning said handle such that said arms securely engage said tires of said second wheel pair.

28. The adjustable stroller of claim 27, further comprising a removable handle bar secured to said upper end of said front frame.

29. The adjustable stroller of claim 28 further comprising an adjustable and removable footrest secured to said front frame near said lower end.

* * * * *